(12) United States Patent
Mohan (10) Patent No.: US 6,175,255 B1
(45) Date of Patent: Jan. 16, 2001

(54) LINE DRIVER CIRCUIT FOR LOW VOLTAGE AND LOW POWER APPLICATIONS

(75) Inventor: Jitendra Mohan, Santa Clara, CA (US)

(73) Assignee: National Seniconductor Corporation, Santa Clara, CA (US)

( * ) Notice: Under 35 U.S.C. 154(b), the term of this patent shall be extended for 0 days.

(21) Appl. No.: 09/198,129

(22) Filed: Nov. 23, 1998

(51) Int. Cl.[7] .................................................. H03K 3/02
(52) U.S. Cl. ............................ 327/108; 326/82; 375/258
(58) Field of Search .................................. 375/222, 257, 375/258; 327/108, 65, 52, 563; 326/82

(56) References Cited

U.S. PATENT DOCUMENTS

| | | | |
|---|---|---|---|
| 3,810,236 | * 5/1974 | Horowitz et al. | 360/53 |
| 4,337,465 | * 6/1982 | Spracklen et al. | 370/395 |
| 4,523,238 | * 6/1985 | Keel et al. | 360/46 |
| 4,536,662 | 8/1985 | Fujii | 327/108 |
| 4,616,174 | * 10/1986 | Jorgensen | 324/117 R |
| 5,272,618 | * 12/1993 | Blake | 363/25 |
| 5,376,833 | 12/1994 | Chloupek | 327/110 |
| 5,408,141 | 4/1995 | DeVore et al. | 327/541 |
| 5,422,599 | * 6/1995 | Larsen | 330/196 |
| 5,424,662 | 6/1995 | Bonaccio | 327/55 |
| 5,729,444 | * 3/1998 | Perol | 363/25 |
| 5,799,040 | * 8/1998 | Lau | 375/258 |
| 6,107,751 | * 8/2000 | Billings | 363/37 |

\* cited by examiner

Primary Examiner—Timothy P. Callahan
Assistant Examiner—Terry L. Englund
(74) Attorney, Agent, or Firm—Limbach & Limbach L.L.P.

(57) ABSTRACT

A line driver circuit capable of operating in 100Base-T mode and 10Base-T mode includes a 1:1 transformer having a primary winding, the primary winding having a center tap. A current source couples to the center tap. A current steering circuit steers drive current from the current source in first and second directions to provide a differential output signal at the output nodes. The current steering circuit includes two switches. Input signals control the opening and closing of the switches such that the switches are never both open at the same time. Thus, during a time period, one switch closes to pull one output node up toward the supply voltage, while the other switch opens to pull the other output node down toward circuit ground. Since the current source couples to the center tap of the transformer, the current source is only pulled down to a voltage half that of the supply voltage rather than to circuit ground. Therefore, the current source has sufficient headroom to drive the output current.

15 Claims, 6 Drawing Sheets

LINE DRIVER CIRCUIT FOR LOW VOLTAGE AND LOW POWER APPLICATIONS

BACKGROUND OF THE INVENTION

1. Field of the Invention

The present invention relates to the field of communications, and in particular, to line drivers.

2. Related Art

A local-area network ("LAN") is a communication system that enables personal computers, work stations, file servers, repeaters, data terminal equipment ("DTE"), and other such information processing equipment located within a limited geographical area such as an office, a building, or a cluster of buildings to electronically transfer information among one another. Each piece of information processing equipment in the LAN communicates with other information processing equipment in the LAN by following a fixed protocol (or standard) which defines the network operation. Information processing equipment made by different suppliers can thus be readily incorporated into the LAN.

The ISO Open Systems Interconnection Basic Reference Model defines a seven-layer model for data communication in a LAN. The lowest layer in the model is the physical layer which consists of modules that specify (a) the physical media which interconnects the network nodes and over which data is to be electronically transmitted, (b) the manner in which the network nodes interface to the physical transmission media, (c) the process for transferring data over the physical media, and (d) the protocol of the data stream.

IEEE Standard 802.3, Carrier Sense Multiple Access with Collision Detection (CSMA/CD) Access Method and Physical Layer Specifications, is one of the most widely used standards for the physical layer. Commonly referred to as Ethernet, IEEE Standard 802.3 deals with transferring data over twisted-pair cables or co-axial cables. The 10 Base-T protocol of IEEE Standard 802.3 prescribes a rate of 10 megabits/second ("Mbps") for transferring data over twisted-pair cables.

The constant need to transfer more information faster, accompanied by increases in data processing capability, necessitated an expansion to data transfer rates considerably higher than the 10-Mbps rate prescribed by the 10 Base-T protocol. As a consequence, a protocol referred to as 100 Base-T was developed for extending IEEE Standard 802.3 to accommodate data moving at an effective transfer rate of 100 Mbps through twisted-pair cables. Under the 100 Base-T protocol, certain control bits are incorporated into the data before it is placed on a twisted-pair cable. The result is that the data and control signals actually move through a twisted-pair cable at 125 Mbps.

In expanding IEEE Standard 802.3 to the 100 Base-T protocol, there are various situations in which it is desirable that the transmitter be capable of using one driver to transmit data at both the 100 Base-T rate and the lower 10 Base-T rate. Accordingly, it is preferable to use a line driver capable of driving both 10 Base-T and 100 Base-T signaling.

In particular, one set of information processing equipment should be capable of driving data moving at the 10 Mbps ("Meg") rate or the 100 Meg rate without having to make any adjustments when the data transfer rate changes from 10 Meg to 100 Meg and vice versa.

Figure 1:
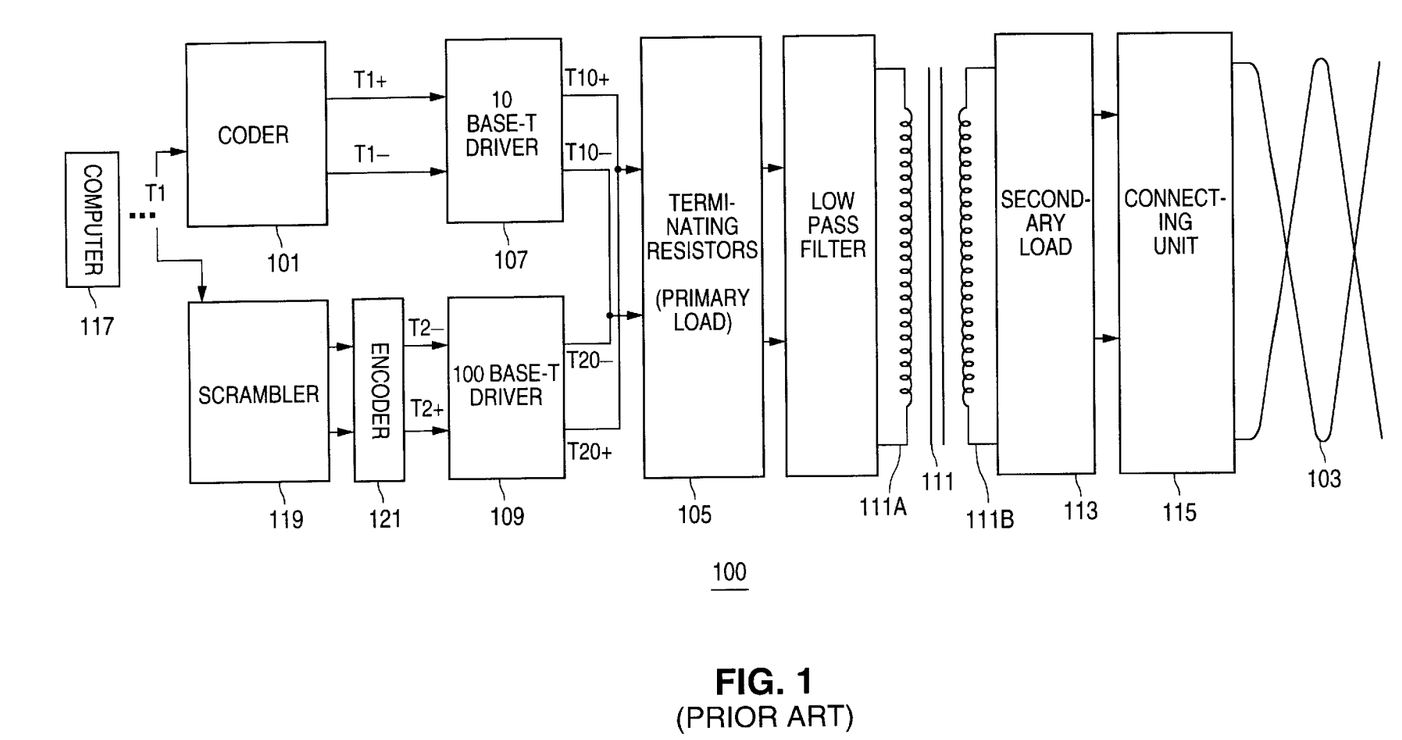
FIG. 1 illustrates a conventional low voltage differential signal driver circuit.

FIG. 1 illustrates the data transmit path 100 of communication in the LAN operating in 100 Base-T. During data transmission, a communication unit operating on the LAN, such as a computer 117, generates a data signal T1 which is converted into differential form for transmission on the twisted pair cable 103. For 10 Base-T transmission, this data signal T1 is Manchester coded 101 to reduce electromagnetic interference and to produce square wave pulses. These waves then go through a waveshaping filter to generate filtered differential data signals T1+/−.

In this description a pair of differential signals means two signals whose current waveforms are out of phase with one another. The individual signals of a pair of differential signals are indicated by reference symbols respectively ending with "+" and "−" notation-e.g., S+ and S−. The composite notation "+/−" is employed to indicate both differential signals using a single reference symbol-e.g., S+/−.

For 100 Meg transmission, scrambler 119 scrambles data signal T1 and converts data signal T1 to differential format. Encoder 121 MLT-3 codes the data signal to generate trinary differential signals T2+/−. A 10 Meg amplifier signal driver 107 and a 100 meg amplifier signal driver 109 take these differential signals T1+/− and T2+/−, respectively, and generate voltage-sourced differential signals T10+/− and T20+/− respectively, to drive a primary load 105 and to transmit them on twisted pair cable 103.

Transformer 111 has a primary winding 111A and a secondary winding 111B which isolate the twisted-pair cable 103 from the circuitry producing the transmit signals. Primary winding 111A terminates at a primary load 105 and secondary winding 111B terminates at a secondary load 113. Secondary load 113 couples to a connecting unit 115, which couples to twisted-pair cable 103. Primary winding 111A couples to a resistive load 105. It is across this resistive load 105 that either sine wave 10 Base-T signaling or MLT-3 100 Base-T signaling must be created.

Recently, current driven amplifiers have been used to drive both the 10 Base-T and the 100 Base-T signalling. Now that it also has become necessary for many commercial integrated circuits to operate at less than the conventional 5 volt power supply voltage, such as 2.5 volts, these line driver circuits must operate over a power supply range from over 5 volts down to 2.5 volts and less. However, although the supply voltage dropped from 5 volts to 2.5 volts, the 10 Base-T signaling mode still requires a 5-volt peak-to-peak output voltage.

Figure 2:
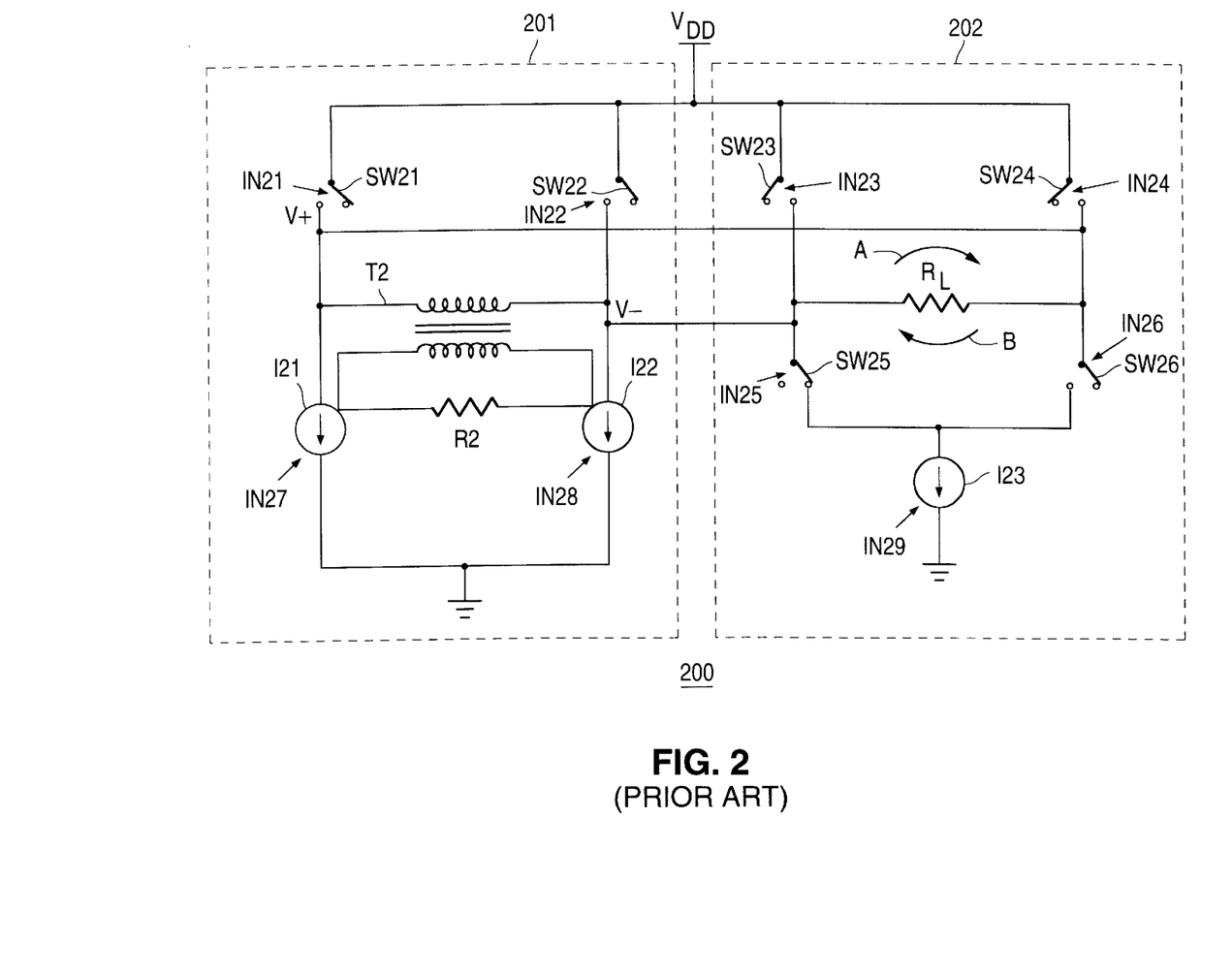
FIG. 2 illustrates a first conventional line driver circuit.

FIG. 2 illustrates a conventional line driver 200 capable of driving both 10Base-T and 100Base-T signaling. Typically, as the circuits move down to lower supply voltages, there is not enough headroom for current sources I21–I23 to operate. Thus, transformer T2 operates in a 1:2 voltage step-up mode with respect to the differential data signals, to boost output voltage Vout to 5 volts peak-to-peak. The difference in voltage between the output nodes V+, V− on the output terminals form the pair of differential signals.

Line driver circuit 200 includes a resistive load RL coupled between output nodes V+, V− and to the primary winding of transformer T2. The secondary winding of transformer T2 couples to a termination resistor R2. Typically, this termination resistor is approximately 100 ohms as required by the Institute of Electrical and Electronics Engineers (IEEE). Line driver circuit 200 also includes a 10Base-T sub-circuit 201 to generate a 5 volt peak-to-peak output signal Vout across resistive load RL, and a 100Base-T sub-circuit 202 to generate a 2 volt peak-to-peak output signal Vout across resistive load RL. The 10Base-T sub-circuit 201 includes switches SW21, SW22, and current sources I21, I22 each of which provide 100 milliamperes (mA) of current. The 100Base-T sub-circuit 202 includes switches SW23–SW26 and current source I23 which provides 40 mA of current. The six switches SW21–SW26 are controlled by input signals IN21–IN26, respectively, and direct current through load resistor RL as indicated by arrows A and B. Typically, these input signals IN21, IN22 are rail-to-rail voltage swings, and input signal IN21 is the inverse of input signal IN22.

In 10Base-T operation, input signals IN27, IN28 are half-wave rectified signals which are 180 degrees out of phase from one another. These signals are applied to current sources I21, I22, respectively, such that only one of the two current sources is active at a time. In addition, input signals IN21, IN22 are applied to switches SW21, SW22 such that one of the switches SW21, SW22 closes and the other opens to steer current through resistive load RL thereby generating a voltage across resistive load RL. During this time, input signal IN29 is applied to current source I23 to keep this current source turned off so 100Base-T sub-circuit 202 is inactive.

In 10Base-T operation, to steer current through resistive load RL in the direction indicated by arrow A, input signals IN21, IN22, IN27 and IN28 are applied such that switch SW21 opens and switch SW22 closes, and current source I22 turns off and current source I21 turns on. In this way, current flows through switch SW22, through transformer T2 and resistive load RL to generate half of the differential output signal Vout. Conversely, to steer current through resistive load RL in the direction indicated by arrow B, input signals IN21, IN22, IN27 and IN28 are applied such that switch SW21 closes and switch SW22 opens, and current source I21 turns off while current source I22 turns on. In this way, current flows through switch SW21, through transformer T2 and resistive load RL, to generate the other half of the differential output signal Vout. As a result, a full differential output voltage swing can be achieved.

On the other hand, in 100Base-T operation, input signal IN29 turns on current source I23. Input signals IN23–IN26 are applied such that two of the four switches SW23–SW26 close at a time to steer the 40 mA current from constant current source I23 and generate a voltage across resistive load RL. During this time 10Base-T sub-circuit 201 is inactive. Input signals IN23–IN26 are also rail to rail voltage swings.

To steer the 40 mA current through resistive load RL in the direction indicated by arrow A, input signals IN23 and IN26 are applied such that switches SW23 and SW26 close at the same time to conduct the current. When switches SW23 and SW26 close, switches SW24 and SW25 open based on input signals IN24, IN25. Thus, output node V− is pulled up toward voltage supply VDD whereas output node V+ is pulled down towards circuit ground.

Subsequently, switches SW23 and SW26 open, causing output voltage Vout to move toward circuit ground. Then, switches SW24 and SW25 close, while switches SW23 and SW26 open to steer current through resistive load RL in the direction indicated by arrow B. Thus, output node V− is pulled down whereas output node V+ is pulled up toward VDD. As a result, the difference in voltages at output nodes V+, V−, provides the MLT-3 output voltage waveformn needed to drive line driver 200 in 100Base-T operation.

Although line driver 200 can operate with a 2.5 supply voltage, line driver 200 requires 1:2 transformer T2. This is because it is impossible to have any headroom for the current source or voltage drop in the switches while driving a 2.5 volt signal across the load with a supply voltage of 2.5 volts or less. These 1:2 transformers are typically more expensive and have lesser quality than 1:1 transformers. In addition, line driver circuit 200 produces a large common mode component Vc, where $$Vc = \frac{V_+ + V_-}{2} \quad (1)$$

where V+ is the voltage at output node V+, and V− is the voltage at output node V−. It is desirable that common mode component Vc be zero, indicating that the voltage signal at output node V+ is exactly out of phase with the voltage signal at output node V−. When this occurs, the signals are truly differential. However, typically the signals are not truly differential and thus, the common mode component Vc is not zero. This common mode component Vc radiates and causes electromagnetic interference ("EMI") on the transmission line. Although such common mode component Vc may be more tolerable in 10Base-T operation due to the lower 10 MHz frequency, such common mode component Vc cannot be tolerated in 100Base-T operation having a higher 125 MHz frequency.

Figure 3:
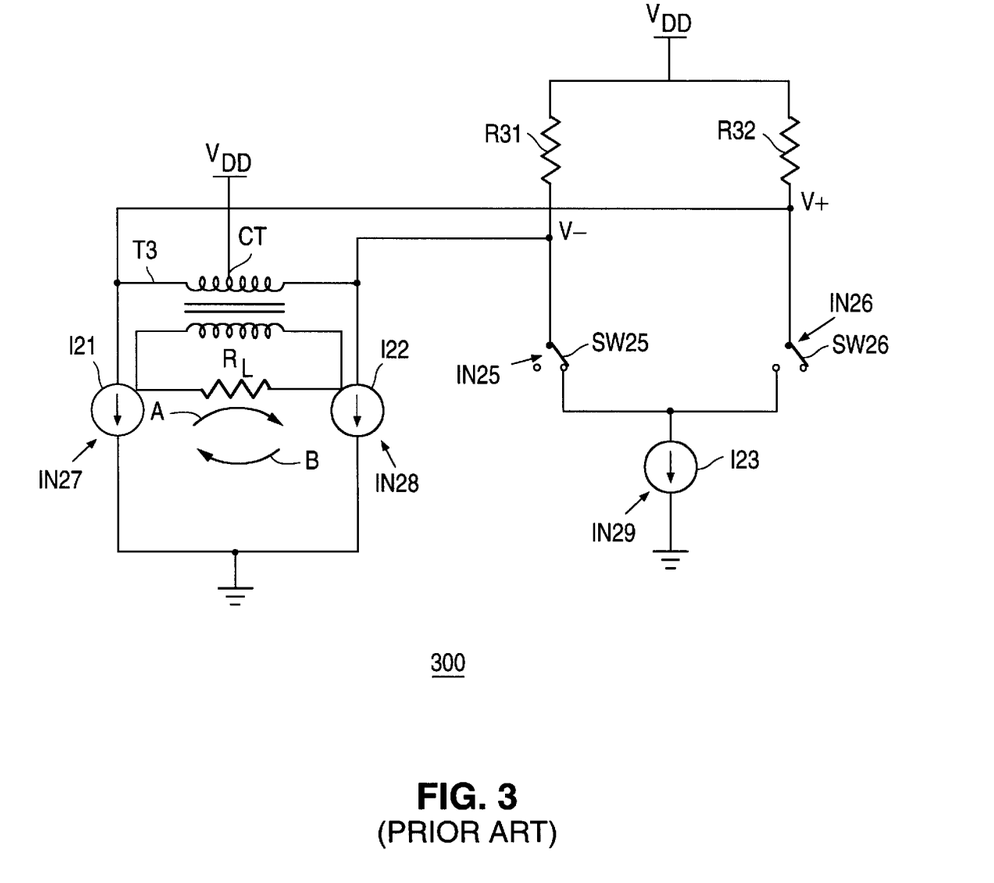
FIG. 3 illustrates a second conventional line driver circuit.

One conventional line driver circuit 300 that operates in both 10Base-T and 100Base-T signaling and overcomes some of the above problems, is illustrated in FIG. 3. This conventional line driver circuit 300 is more advantageous than conventional line driver circuit 200 because it utilizes a 1:1 transformer T3 and can still operate with a 2.5 volt supply voltage. In this circuit 300, switches SW21, SW22 from line driver circuit 200 are eliminated, and switches SW23 and SW24 from conventional line driver circuit 200 are replaced by 50 ohm resistors R31, R32, respectively. These resistors R31, R32 provide termination for transformer T3 as well as provide two paths to pull current through line driver circuit 300.

Operation of line driver circuit 300 is similar to that of line driver circuit 200. In 10Base-T operation, half-wave rectified signals input signals IN27, IN28 are applied to 100 mA current sources I21, I22, respectively, to such that they alternate between being active and inactive to steer the 100 mA current through resistive load RL in the direction indicated by arrows A and B. For example, when current source I21 is active, current flows to the primary winding of transformer T3 which induces current to flow through resistor RL in the direction indicated by arrow A. In 100Base-T operation, input signals IN25, IN26 control switches SW25, SW26 to open and close to steer the 40 mA current through resistive load RL in the direction indicated by arrows A and B.

As illustrated in FIG. 3, the center tap CT of transformer T3 couples to voltage supply VDD. In this way, common mode voltage Vc is forced to equal supply voltage VDD. Since supply voltage VDD is a constant at 2.5 V, common mode voltage Vc is fixed at 2.5 Volts. Using equation (1), in order to obtain the necessary headroom for line driver circuit 300 to drive 5 volts peak-to-peak with a 2.5 volt supply voltage, output nodes V−,V+ of line driver circuit 300 swing above and below supply voltage VDD.

In operation, since input signals IN27, IN28 are 180 degrees out of phase from one another, when current source I22 is active current source I21 is inactive and vice versa. When current source I21 is active it pulls the voltage at output node V+ down and consequently the voltage at output node V− goes up due to the transformer T3 action. The maximum single-ended output voltage swing Vmax is $$Vmax = \frac{V_{p-p}}{4} + VDD \quad (2)$$

where Vp-p is the peak-to-peak voltage across transformer T3. Substituting 5 volts for the desired peak-to-peak voltage Vp-p and 2.5 volts for VDD, $$Vmax = \frac{5}{4} + 2.5 \quad (3)$$

Since maximum single-ended output voltage swing Vmax is 3.75 (Vmax=1.25+2.5), output voltage Vout swings above common mode voltage Vc, which is supply voltage VDD, by approximately 1.25 volts.

Since output voltage Vout exceeds supply voltage VDD, the devices which make up current sources I21–I23, typically Complementary Metal Oxide Semiconductor ("CMOS") devices, tend to breakdown. These CMOS devices are only intended to handle a maximum supply voltage VDD, which is shown in FIG. 2 as 2.5 volts. When output voltage Vout of line driver circuit 300 goes above this voltage level, which can be as high as approximately 4 volts (2.5 V+1.25 V), the CMOS devices fail due to their inability to withstand the high voltage. Thus, special circuits and special processes are needed for line driver circuit 300 to operate properly.

Since output voltage Vout swings above and below supply voltage VDD, this line river circuit 300 eliminates the headroom limitations of conventional line driver circuit 200. This line driver circuit 300 also eliminates common mode voltage Vc radiation by fixing it at supply voltage VDD. However, the disadvantages of this circuit are the special process and/or circuit requirements needed to prevent breakdown of the components of the circuit. Certain processes utilize dual gate oxide transistors such as, CMOS devices, which are capable of handling higher voltages at the cost of lower performance, such as decreased speed or increased area. Optionally, certain processes may allow particular operating conditions such that a regular CMOS device can withstand higher voltages for shorter periods of time. Usually, these restrictions are quite limiting and the resulting circuit configurations are large in area and poorer in performance.

Another disadvantage of line driver circuit 300 compared to line driver circuit 200 is that twice the current must be driven into the load and the termination network to obtain the required voltage swing. Therefore, the circuit may need to be configured for class B operation to drive both 10Base-T and 100Base-T signaling to save power.

Thus, a need exists for a cost effective and high quality line driver circuit capable of driving both 10Base-T and 100Base-T signalling using a low voltage power supply.

SUMMARY OF THE INVENTION

A differential current driving circuit in accordance with one embodiment of the present invention includes a current source coupled to the center tap of the primary winding of a 1:1 transformer. A current steering circuit, also coupled to the primary winding of the transformer, directs the drive current from the current source. In 10Base-T operation, the current steering circuit receives an input signal and in accordance therewith directs the drive current in either a first or second direction to provide drive currents which together form a differential output signal at the output nodes. With this configuration, the common mode voltage does not get pulled down towards circuit ground as in conventional line driver circuits, but rather is only pulled down to a voltage approximately half that of the supply voltage. Therefore, the current source, which is also coupled to the center tap, is also pulled down to this same voltage rather than toward circuit ground. As a result, the current source has ample headroom to drive the output current.

A differential current driving circuit in accordance with another embodiment of the present invention also includes a 100Base-T circuit. This 100Base-T circuit includes a second current steering circuit coupled to the primary winding of the transformer and a second current source coupled to the current steering circuit. The current source in the 10Base-T and 100Base-T circuits alternate between active and inactive states, such that the active state of one current source is contemporaneous with the inactive state of the other current source. Depending upon which current source is active, the corresponding current steering circuit then directs the drive current from the active current source to the output nodes.

In another embodiment of the present invention, a first capacitor couples across the current source in the 10Base-T circuit to the center tap. A second capacitor couples between the output nodes. The second capacitor is common to both the 10Base-T and 100Base-T circuits and its capacitance is determined by how much capacitance can be tolerated by the 100Base-T circuit. However, the first capacitor affects only 10Base-T operation. Such configuration provides independent 10Base-T filtering for better EMI and does not affect the 100Base-T circuit performance.

These and other features and advantages of the present invention will be understood upon consideration of the following detailed description of the invention and the accompanying drawings.

BRIEF DESCRIPTION OF THE DRAWINGS

Like reference symbols are employed in the drawings and in the description of the preferred embodiments to represent the same or similar items.

DESCRIPTION OF THE PREFERRED EMBODIMENT

Figure 4:
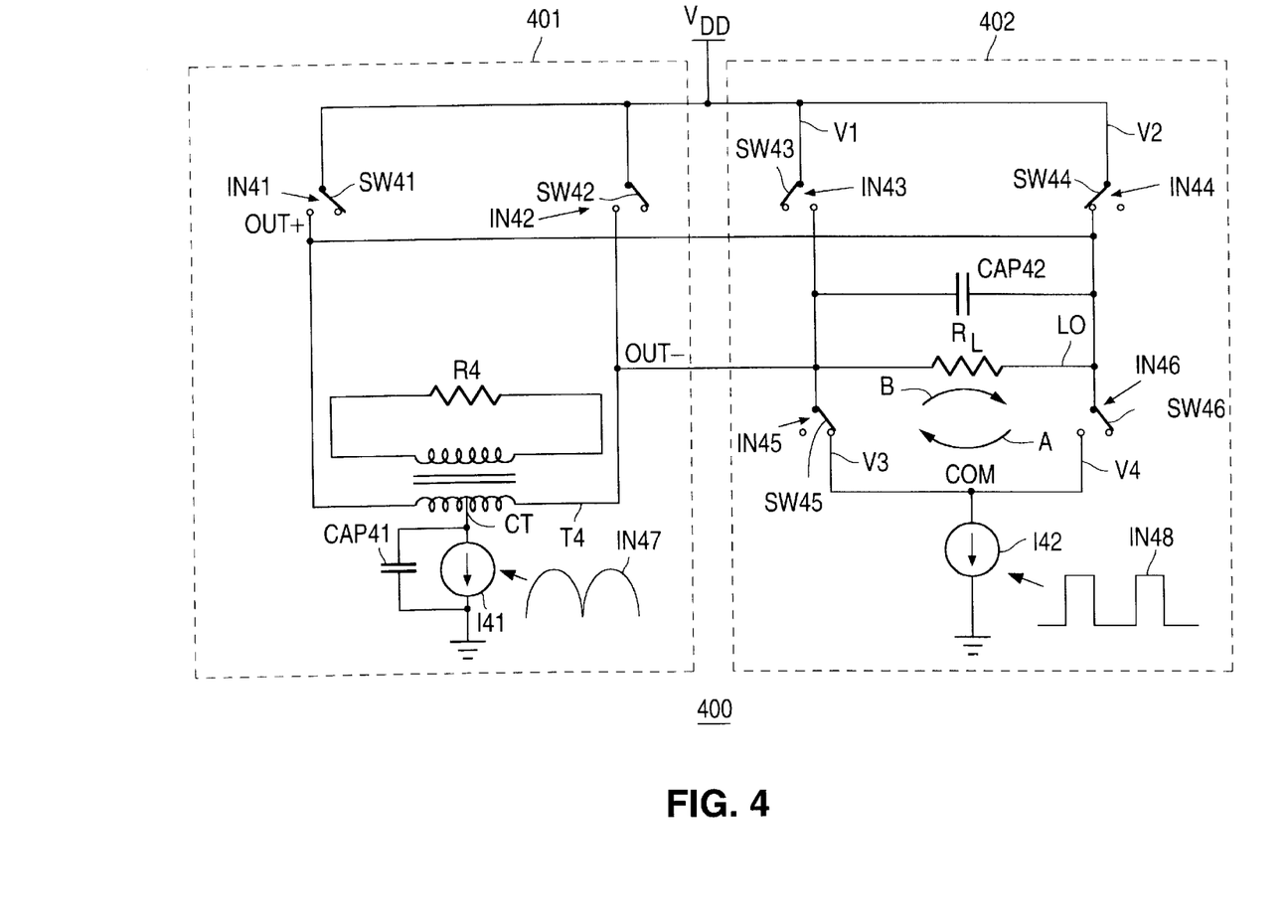
FIG. 4 illustrates a line driver circuit in accordance with an embodiment of the present invention.

A schematic diagram of a line driver circuit 400 in accordance with a first embodiment of the present invention is illustrated in FIG. 4. Line driver circuit 400 is capable of operating in both 100Base-T and 10Base-T signaling modes. For explanatory purposes only, line driver circuit 400 is illustrated with a 10Base-T side 401 and a 100Base-T side 402. The 10Base-T signaling side 401 includes switches SW41, SW42 and a current source I41 coupled to the primary winding of transformer T4. The secondary winding of transformer T4 couples to R4 which is the 100 ohm termination required by the IEEE. It will be appreciated that transformer T4 is a 1:1 transformer although it is effectively used as a 1:2 transformer for 10Base-T operation. There is an option of using transformer T4 either as a 1:1 or 1:2 transformer for 100Base-T operation.

Referring to the 10Base-T side 401, it can be seen that the 10Base-T side 401 has only one current source I41, rather than two current sources as in conventional line driver circuits 200, 300, illustrated in FIGS. 2 and 3, respectively. This current source I41 couples to the center tap CT of transformer T4. Therefore, all the drive for line driver circuit 400 comes from center tap CT. In this exemplary embodiment, current source I41 is 100 mA and drives a full-wave rectified sine wave input signal IN47. Typically, current source I41 is a digital to analog converter (DAC) with a digital waveshaping circuit.

Switch SW41 couples between supply voltage VDD and output node OUT+, and switch SW42 couples between supply voltage VDD and output node OUT−. Input signals IN41, IN42 control the opening and closing of switches SW41, SW42, respectively, to direct current through resistive load RL. For example, when switch SW41 closes and switch SW42 remains open, current flows through resistive load RL in the direction indicated by arrow A, and when switch SW41 opens and switch SW42 closes, current flows through resistive load RL in the direction indicated by arrow B.

Referring to the 100Base-T side 402, the configuration is similar to an H-bridge. A load segment LO extends horizontally and contains resistive load RL. In this exemplary embodiment resistive load RL is 100 ohms. Load segment LO couples between end nodes OUT+, OUT−. Vertical segment V1 extends between left end node OUT− and voltage supply VDD. Connected between left end node OUT− and common node COM is vertical segment V3. Vertical segment V2 extends between right end node OUT+ and voltage supply VDD, while vertical segment V4 extends between right end node OUT+ and common node COM. (The reference to "vertical" and "horizontal" orientations of the segments of the modified H-bridge circuit are, of course, merely for descriptive purposes and do not necessarily describe the actual layout of the circuit.) Each of the vertical segments V1, V2, V3, V4 contains a respective switch SW43, SW44, SW45, SW46. It will be appreciated that switches SW43–SW46 may be metal oxide semiconductor (MOS) or bipolar devices which turn on and off upon being applied with input signals IN43–IN46, respectively.

Current source I42 couples between common node COM and circuit ground. In this exemplary embodiment, current source I42 drives a 20 mA current pulse signal IN48. The operation of the 100Base-T side 402 of line driver circuit 400 is similar to that of conventional line driver circuit 300.

Figure 5A:
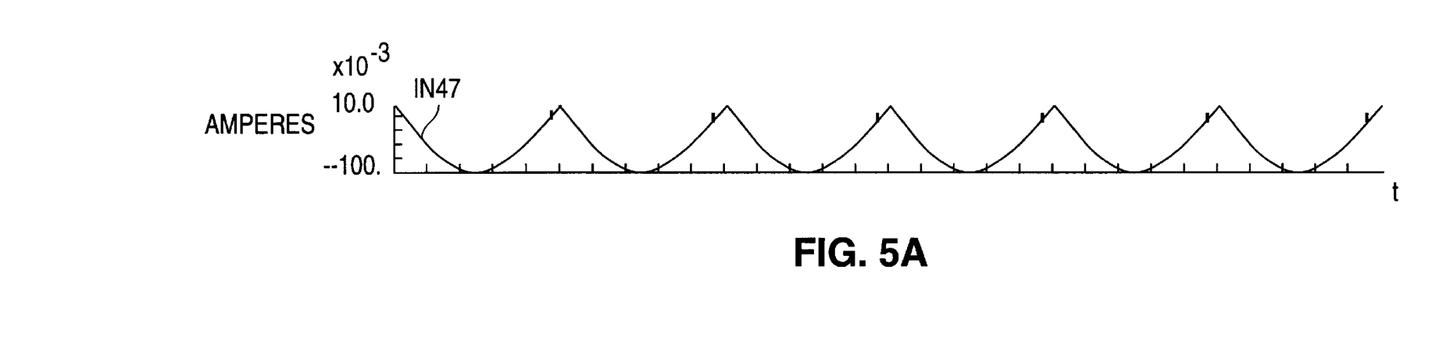
FIGS. 5A–5G illustrate simulated transient signal analysis in accordance with an embodiment of the present invention.

Operation of 10Base-T sub-circuit 401 is now explained with FIGS. 5A–5G which illustrate simulated transient responses of various signals when line driver circuit 400 operates in 10Base-T mode. In 10Base-T operation, sub-circuit 401 drives the full-wave rectified sine wave input signal IN47. FIG. 5A illustrates a simulated waveform input signal IN47 from current source I41. As shown, the current is a full-wave rectified signal.

During operation in 10Base-T mode, switches SW41 and SW42 are never both open at the same time. These switches SW41, SW42 are controlled by input signals IN41, IN42, illustrated in FIGS. 5B and 5C, respectively. As shown, input signals IN41, IN42 are rail to rail voltage signals, which are either "high" or "low." Input signal IN41 is the inverse of input signal IN42. Thus, when input signal IN41 is high, input signal IN42 is low, and vice versa. In the exemplary embodiment, switches SW41, SW42 close when input signals IN41, IN42 are "high" and open when input signals IN41, IN42 are "low." (However, it will appreciated that switches SW41, SW42 may close when signals IN41, IN42 are low, and open when signals IN41, IN42 are high.)

Figure 5B:
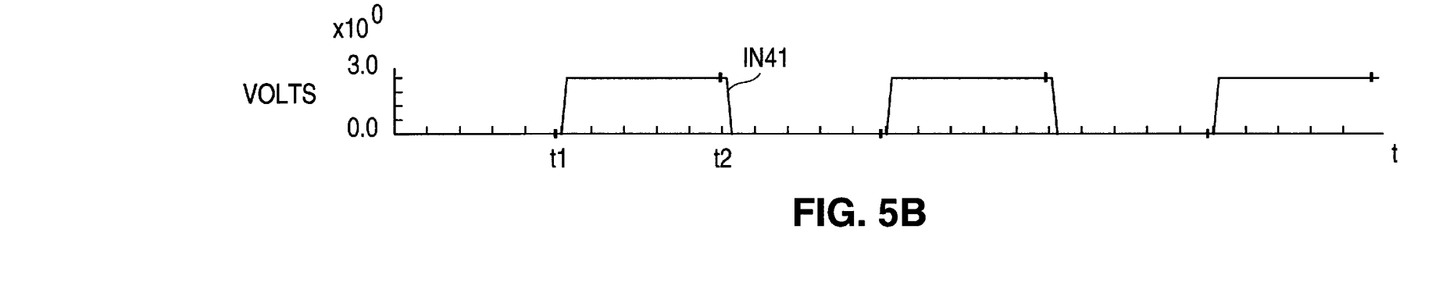
Figure 5C:
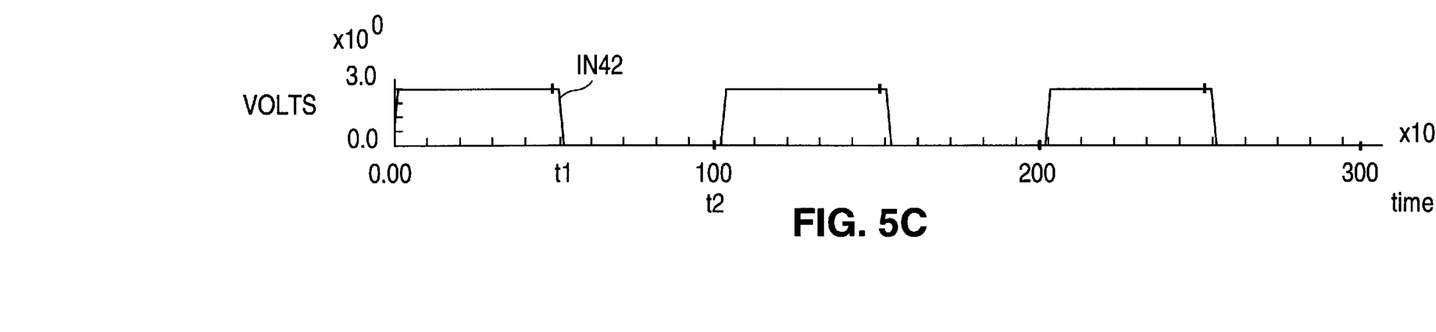
Figure 5D:
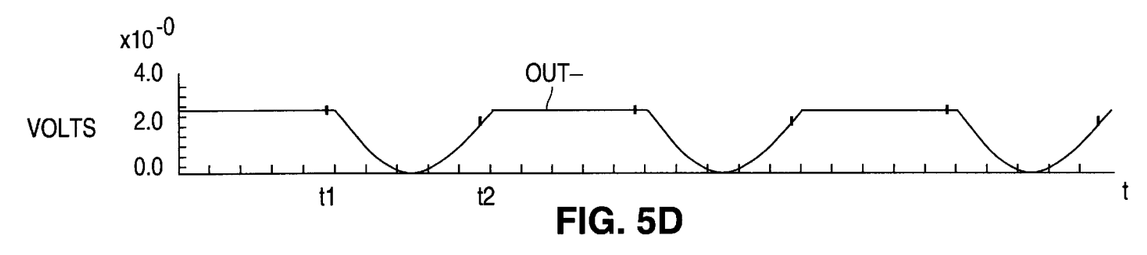
Figure 5E:
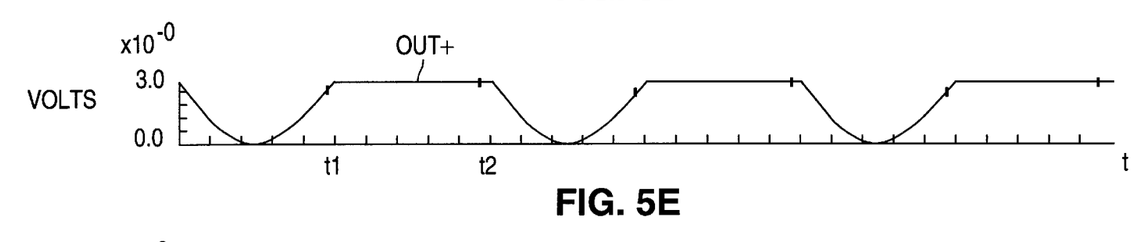

As illustrated in FIG. 5B, between time t1 and time t2, input signal IN41 is high. Thus, switch SW41 closes and output signal OUT+ gets pulled up towards supply voltage VDD as shown in FIG. 5E. In the exemplary embodiment illustrated in FIG. 4, voltage supply VDD is 2.5 volts. While input signal IN41 is high during this time, input signal IN42 is low, as shown in FIG. 5C. Thus, switch SW42 opens and output signal OUT− is pulled down between time t1 and time t2, as shown in FIG. 5D. In this exemplary embodiment, output signal OUT− is pulled down toward circuit ground, which is approximately 0 volts, because 10Base-T sub-circuit 401 is driving a 2.5 volt signal. However, since switch SW42 is open, nothing is connected to output signal OUT−. This means that switch SW42 does not conduct any current and is seen as a high impedance load at node OUT−. Therefore, switch SW42 does not suffer from the over voltage problems experienced by conventional line driver circuit 300, or the headroom problems experienced by conventional line driver circuit 200. As indicated by equation (1), common mode voltage Vc is the voltage at center tap CT of transformer T4:

$$Vc = \frac{OUT_+ + OUT_-}{2} \quad (1)$$

Figure 5F:
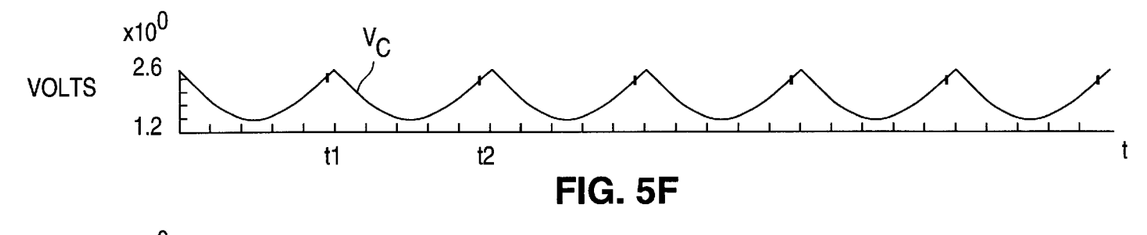

When output signal OUT+ is pulled up to 2.5 volts and output signal OUT− is pulled down to almost 0 volts, common mode voltage is pulled down to approximately 1.25 volts as illustrated in FIG. 5F. Current source I41, which is coupled to center tap CT also gets pulled down only to 1.25 volts. Therefore, current source I41 has ample headroom to drive the output current. For example, in this exemplary embodiment current source I41 has 1.25V of headroom to drive a 100 mA peak output current. Thus, even though 10Base-T sub-circuit 401 is driving signals having the same amplitude as those driven by conventional line driver circuits 200 and 300, line driver circuit 400 does not have the headroom problem of those line driver circuits 200, 300.

As the current in current source I41 reduces to zero, the common mode voltage Vc moves back up to 2.5 volts as illustrated in FIG. 5F. Then, in the next cycle, switch SW41 opens and output signal OUT+ gets pulled down toward circuit ground. At this time, switch SW42 closes such that output signal OUT− is pulled up toward voltage supply VDD. Thus, common mode voltage Vc again decreases to approximately 1.25 volts. In this way, line driver circuit 400 drives the common mode voltage Vc, and output signals OUT+ and OUT− are a result of common mode voltage Vc and the action of transformer T4.

FIG. 5D illustrates the transient response of output signal OUT−. As shown, the signal remains constant at 2.5 volts, voltage supply VDD, and then decreases to 0 volts. The decrease in voltage reflects the transition of switch SW42 from the closed to the open state. Then, when switch SW42 subsequently closes again, the transient response illustrates the increase in voltage of common mode voltage Vc until reaching 2.5 volts. FIG. 5E illustrates the transient response of output signal OUT+, which is virtually an inverse of transient response of output signal OUT−.

FIG. 5F illustrates a simulated transient response of the waveform of common mode voltage Vc. As can be seen from the plot of voltage versus time, common mode voltage Vc is a full-wave rectified sine wave which peaks at the supply voltage VDD value, which is 2.5 volts in the exemplary embodiment, and decreases to 1.25 volts. Thus, with respect to the configuration of line driver circuit 400 for 10Base-T operation, the lowest voltage current source I41 sees is 1.25 volts. This is in contrast to the conventional line driver circuit 200 illustrated in FIG. 2, which sees 0 volts and thus cannot operate.

Figure 5G:
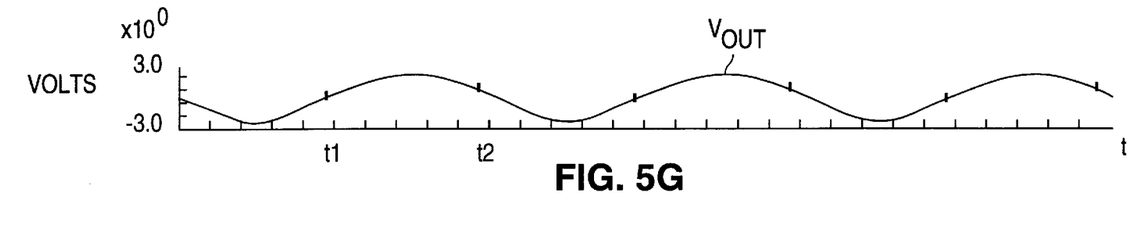

FIG. 5G illustrates a simulated response of differential output voltage Vout, which is the output of the entire circuit 400. This output voltage Vout is the difference which resistor R4 on the secondary winding of transformed T4 is going to see.

In 100Base-T operation, current source I41 is inactive and current source I42 is active. Switches SW43–SW46 are controlled by rail-to-rail voltage input signals IN43–IN46 similar to input signals IN41, IN42 illustrated in FIGS. 5B and 5C. In an exemplary embodiment, switches SW43–SW46 close when input signals IN43–IN46 are "high" and open when input signals IN43–IN46 are "low." (However, it will appreciated that switches SW43–SW46 may close when input signals IN43–IN46 are low, and open when input signals IN43–IN46 are high.) Input signals IN43 and IN46 are both either "high" or "low" at the same time, while input signals IN44 and IN45 are both "high" or "low" at the same time. (It will be appreciated that input signals IN43 and IN46 may be the same signal or two separate signals. Similarly, input signals IN44 and IN45 may be the same signal or two separate signals.) As a result, switches SW44 and SW45 are open when switches SW43 and SW46 are closed, and are closed when switches SW44 and SW45 are open.

The transition of switches SW43–SW46 occurs when input signals IN43–IN46 change from high to low or from low to high. Thus, when both input signals IN43 and IN46 are "high", switches SW43 and SW46 close to steer drive current from current source I42 through the load resistor RL as indicated by arrow B. During this time, input signals IN44, IN45 are "low" so switches SW44 and SW45 are open. When the drive current is steered in this direction, output signal OUT+ is pulled low and output signal OUT− is pulled high.

When input signals IN43, IN46 go switch from high to low, switches SW43 and SW46 open. At this time, input signals IN44, IN45 switch from low to high closing switches SW44 and SW45 to direct current through resistive load RL in the direction indicated by arrow A. During this time, input signals IN44, IN45 are "high", switches SW44 and SW45 close to steer drive current from current source I42 through the load resistor RL as indicated by arrow A. When the drive current is steered in this direction, output signal OUT+ is pulled high and output signal OUT− is pulled low.

It will be appreciated that the 100Base-T sub-circuit 402 may be operated as a class A, class AB or a class B amplifier independent of 10Base-T sub-circuit 401. Typically, in conventional line driver circuit architecture, because of the headroom issue, once a circuit is constructed for 10Base-T operation, that same configuration must be used for 100Base-T operation as well. However, the architecture of line driver circuit 400 is such that the 100Base-T sub-circuit 402 is not limited to using the 10Base-T architecture for operation in other than 10Base-T mode. Thus, although in 10Base-T mode, line driver circuit 400 has a common mode voltage Vc and uses transformer T4 as an effective 1:2 transformer, such use is not required for 100Base-T operation. Instead, in 100Base-T mode, by opening switches SW41, SW2 and turning off current source I41, line driver circuit 400 can be used as purely a class A, class AB or class B amplifier. In the exemplary embodiment illustrated in FIG. 4, 100Base-T sub-circuit 402 is configured as a class B amplifier.

There are several other advantages to circuit 400. First, neither of the output signals OUT+, OUT− go higher than supply voltage VDD. Instead, output signals OUT+, OUT− are always within the range of circuit ground to supply voltage VDD. The maximum signal ended voltage is the peak-to-peak voltage Vp-p divided by 2. Thus, when the peak-to-peak voltage is 5 volts, the maximum single ended voltage is 2.5 volts, which is within the range of circuit ground to supply voltage VDD. This avoids the circuitry breakdown problems and special process issues experienced by conventional line driver circuit 300 due to common mode voltage Vc increasing above supply voltage VDD.

Another advantage is the smaller die size of line driver circuit 400 compared to conventional line driver circuits 200, 300. Only one current source I41 is used for 10Base-T operation, and line driver circuit 400 drives only 20 mA in 100Base-T operation rather than 40 mA. Thus, line driver circuit 400 is smaller, making it less expensive to manufacture.

Yet another advantage of line driver circuit 400 is the elimination of EMI caused by the common mode component Vc in 100Base-T operation. This EMI is not so significant in 10Base-T operation because it is one-twelfth the frequency of that in 100Base-T operation. Thus, a common mode component Vc can be tolerated in 10Base-T operation, but in 100Base-T operation where it cannot be tolerated, using line driver circuit 400 the common mode component Vc can be set to zero.

A further advantage of line driver circuit 400 is that it incorporates independent 10Base-T filtering for EMI. In conventional line driver circuits, because the 10Base-T pins and the 100 Base-T pins share the same output, the amount of capacitance that can be put on the output lines is limited. Since 10Base-T is low frequency operation, a large capacitor is typically required to perform any kind of filtering. However, such large capacitor degrades the performance of 100Base-T operation. Thus, the capacitance is dictated by how much can be tolerated by the 100Base-T circuitry. The configuration of line driver circuit 400 allows a capacitor CAP41 to be coupled to center tap CT, across current source I41, rather than on the output lines. Then, a separate capacitor CAP42 can be coupled between output pair OUT+, OUT−. This capacitor CAP42 is common between 10Base-T operation and 100Base-T operation and is determined by how much capacitance can be tolerated by 100Base-T circuitry. However, capacitor CAP41 affects only 10Base-T operation. Thus, if some output filtering was necessary for 10Base-T operation, for example, to reduce EMI or distortion, this can be achieved by connecting capacitor CAP41 to center tap CT. Such configuration provides independent 10Base-T filtering for better EMI and does not affect 100Base-T performance.

Still another advantage of line driver circuit 400 is low power consumption. For example, in 100Base-T mode, line driver circuit 400 consumes only approximately 25 milliwatts ("mW") for class B operation and in 10Base-T mode, line driver circuit 400 consumes approximately 50 mW. In addition, line driver circuit 400 provides a fully differential 100Base-T signaling at comparatively less power. Because 1:2 transformer T4 can be used as a 1:1 transformer, line driver circuit 400 uses only half the power that, for example, conventional line driver circuit 300 uses. Although conventional line driver circuit 300 can drive a fully differential signal, this circuit 300 requires two times as much current as line driver circuit 400 in 100Base-T mode.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a differential current driving circuit for providing a differential signal to an external circuit, said differential current driving circuit comprising:

a transformer having a primary winding and a secondary winding, the primary winding having a center tap;

a varying current source coupled to the center tap of the transformer and configured to source a first drive current into a current steering circuit;

first and second nodes coupled directly to the primary winding of the transformer and to the external circuit and configured to convey second and third drive currents; and the current steering circuit coupled to the primary winding of the transformer and configured to receive first and second input signals, wherein the current steering circuit, in accordance with the first input signal, steers the first drive current to provide the second drive current, and in accordance with the second input signal steers the first drive current to provide the third drive current, wherein the second and third drive currents form at the first and second nodes the differential signal.

2. The apparatus of claim 1, further comprising a termination resistor coupled to the secondary winding of the transformer.

3. The apparatus of claim 1, wherein the current steering circuit comprises a pair of switching circuits.

4. The apparatus of claim 1, wherein the external circuit comprises a resistive load coupled to the nodes.

5. An apparatus including a differential current driving circuit for providing a differential signal to an external circuit, said differential current driving circuit comprising:

a transformer having a primary winding and a secondary winding, the primary winding having a center tap;

a current source coupled to the center tap of the transformer and configured to source a first drive current into a current steering circuit;

first and second nodes coupled to the primary winding of the transformer and to the external circuit and configured to convey second and third drive currents; and the current steering circuit coupled to the primary winding of the transformer and configured to receive first and second input signals, wherein the current steering circuit, in accordance with the first input signal, steers the first drive current to provide the second drive current, and in accordance with the second input signal steers the first drive current to provide the third drive current, wherein the second and third drive currents form at the first and second nodes the differential signal; and a capacitive circuit coupled across the current source.

6. An apparatus including a differential current driving circuit for providing a differential signal to an external circuit, said differential current driving circuit comprising:

a transformer having a primary winding and a secondary winding, the primary winding having a center tap;

a current source coupled to the center tap of the transformer and configured to source a first drive current into a current steering circuit;

first and second nodes coupled to the primary winding of the transformer and to the external circuit and configured to convey second and third drive currents; and the current steering circuit coupled to the primary winding of the transformer and configured to receive first and second input signals, wherein the current steering circuit, in accordance with the first input signal, steers the first drive current to provide the second drive current, and in accordance with the second input signal steers the first drive current to provide the third drive current, wherein the second and third drive currents form at the first and second nodes the differential signal, and wherein the transformer comprises a 1:1 transformer.

7. An apparatus including a differential current driving circuit capable of operating in either 10Base-T or 100Base-T mode for providing a differential signal to an external circuit, said differential current driving circuit comprising:

a transformer having a primary winding and a secondary winding, the primary winding having a center tap;

a first current source coupled to the center tap of the transformer and configured to source a first drive current into a first current steering circuit;

first and second nodes coupled to the primary winding of the transformer and to the external circuit and configured to convey second and third drive currents; and the first current steering circuit coupled to the primary winding of the transformer and the first and second nodes and configured to receive first and second input signals;

a second current steering circuit coupled to the primary winding of the transformer and to the first and second nodes, and configured to receive third and fourth input signals;

a second current source coupled to the second current steering circuit and configured to source a fourth drive current into the second current steering circuit;

wherein the first and second current sources alternate between an active and an inactive state, and said first current source active state is contemporaneous with said second current source inactive state and said first current source inactive state is contemporaneous with said second current source active state, wherein during the active state of the first current source, in accordance with the first input signal, the first current steering circuit steers the first drive current to provide the second drive current, and in accordance with the second input signal, steers the first drive current to provide the third drive current, and wherein during the active state of the second current source, in accordance with the third input signal, the second current steering circuit steers the fourth drive current to provide the second drive current, and in accordance with the fourth input signal steers the fourth drive current to provide the third drive current, wherein the second and third drive currents form at the first and second nodes the differential signal.

8. The apparatus of claim 7, further comprising a capacitive circuit coupled across the first current source.

9. The apparatus of claim 7, further comprising a termination resistor coupled to the secondary winding of the transformer.

10. The apparatus of claim 7, wherein the transformer comprises a 1:1 transformer.

11. The apparatus of claim 7, wherein the first current steering circuit comprises a pair of switching circuits.

12. The apparatus of claim 7, wherein the second current steering circuit comprises four switching circuits.

13. The apparatus of claim 7, wherein the external circuit comprises a resistive load coupled between the nodes.

14. The apparatus of claim 7, further comprising a first capacitive circuit coupled across the first current source and a second capacitive circuit coupled between the nodes.

15. A method of providing a differential signal to an external circuit, said method comprising the steps of:

providing a first varying drive current to a center tap of a transformer;

conveying second and third drive currents via first and second nodes which are coupled directly to the external circuit and a primary winding of the transformer;

steering the first drive current, in accordance with a first input signal to provide the second drive current, and in accordance with a second input signal to provide the third drive current, wherein the second and third drive currents form at the first and second nodes the differential signal.

* * * * *

UNITED STATES PATENT AND TRADEMARK OFFICE
CERTIFICATE OF CORRECTION

PATENT NO.    : 6,175,255 B1
DATED         : January 16, 2001
INVENTOR(S)   : Mohan It is certified that error appears in the above-identified patent and that said Letters Patent is hereby corrected as shown below:

<u>Title page</u>,
Item [73], Assignee, "National Seniconductor" should be -- National Semiconductor --

Signed and Sealed this

Tenth Day of August, 2004

JON W. DUDAS
*Acting Director of the United States Patent and Trademark Office*